United States Patent
Peyrot

[11] 3,795,429
[45] Mar. 5, 1974

[54] OPEN BALL BEARING

[76] Inventor: Jean-Pierre Peyrot, 1, avenue de la Division du General Lecler, Villejuif, Val de Marne, France

[22] Filed: Aug. 16, 1971

[21] Appl. No.: 171,878

[30] Foreign Application Priority Data
Aug. 18, 1970  France .................................. 7030265

[52] U.S. Cl. .............................. 308/185, 308/189 R
[51] Int. Cl. ............................................. F16c 19/02
[58] Field of Search ................. 308/6 C, 185, 189 R

[56] References Cited
UNITED STATES PATENTS

| | | | |
|---|---|---|---|
| 732,490 | 6/1903 | York | 308/185 |
| 560,322 | 5/1896 | McGloin | 308/185 |
| 575,618 | 1/1897 | Schon | 308/185 |
| 2,402,290 | 6/1946 | Nenninger et al. | 308/185 |
| 2,793,920 | 5/1957 | Haaff | 308/6 C |
| 2,972,162 | 2/1961 | Townsend | 308/6 C |
| 3,186,250 | 6/1965 | Boutwell | 308/6 C |

FOREIGN PATENTS OR APPLICATIONS
211,992  3/1924  Great Britain ...................... 308/185

OTHER PUBLICATIONS
Catalog No. 4, Thomson Industries, Inc. Ball Bushings, Oct. 14, 1958, pg. 10, 11.

Primary Examiner—Charles J. Myhre
Assistant Examiner—Barry Grossman
Attorney, Agent, or Firm—Karl W. Flocks

[57] ABSTRACT

Open ball bearing in which the bearing cage comprises an inner crown and an outer crown lined with bearing balls on a single endless race or track, the opening or aperture of the crowns curving in the shape of a clamp or pliers enabling a recessed shaft to be rotatably lodged inside the inner crown or curved element of the bearing balls for circular welding on a tube placed in the recess.

4 Claims, 3 Drawing Figures

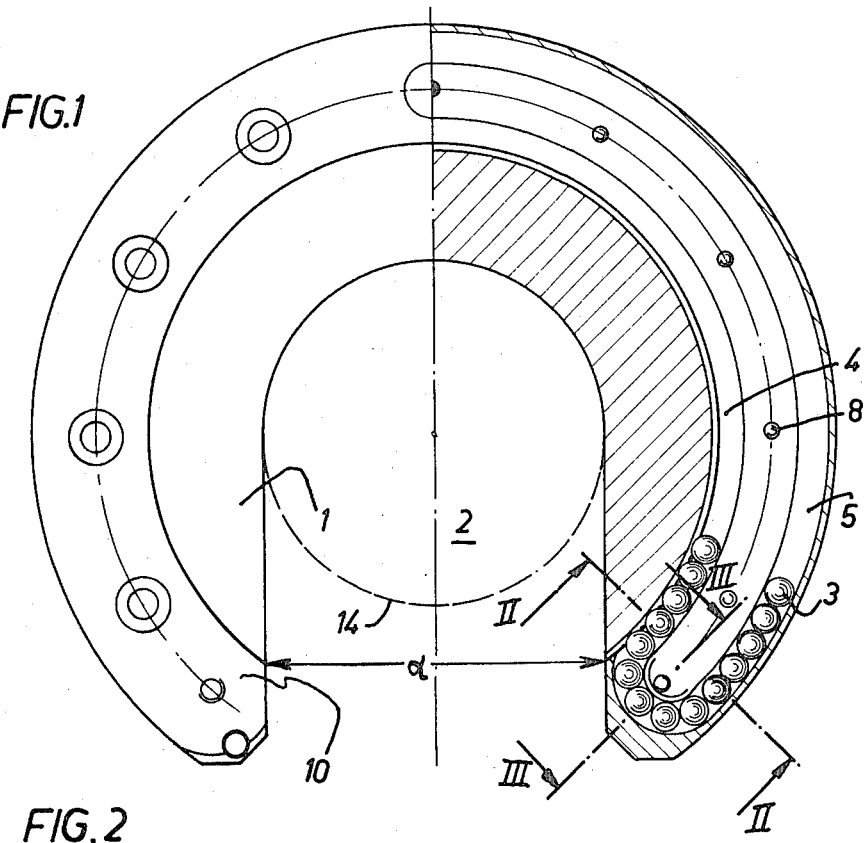
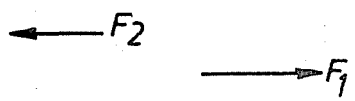
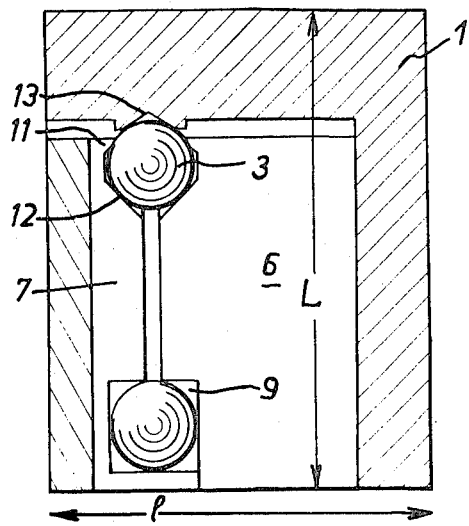
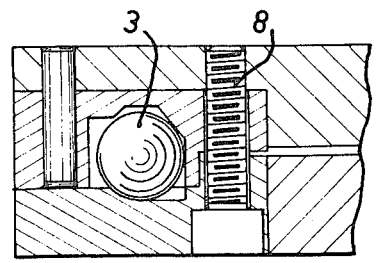

OPEN BALL BEARING

The present invention relates to an open ball bearing, and in particular to an endless roller bearing curving back on itself in the form of a pair of pliers on a clamp in which can be rotatably lodged a portion of hollowed out or recessed shaft the opening or aperture of which corresponds to the passage provided in the opening of the "pliers" or "clamp."

In machining and circular welding techniques, or in that of non destructive inspection or control operations, it is indeed advantageous for rapid mass production on large scale treatment to centrally locate the rotating part inside the bearing roller by immediate direct application of this part, this avoiding any introduction with axial displacement of positioning collars on its ends.

The present invention thus provides a roller bearing cage curving back on itself more than 180°, comprising an inner open crown and an outer open crown of an endless ball bearing, an open portion between the two plier shaped ends of the cage permitting the introduction of a part to be machined, welded or inspected inside said inner crown, in the "cradle" of a hollowed out or recessed shaft pivotally mounted and in contact with the bearing balls.

Other characteristics and advantages will become evident from the description to follow made with reference to the attached drawing and giving an indicative, but in no way limitative, form of embodiment of the invention.

On this drawing:

FIG. 1 is a partially cut away view of a roller bearing according to the invention.

FIG. 2 is a cross section on a larger scale along line II—II of FIG. 1; and

FIG. 3 is a cross section on a larger scale along line III—III of FIG. 1.

In FIG. 1 is seen a roller bearing cage generally designated 10 inside which can freely rotate a shaft 1 hollowed out or recessed at 2.

The cage 10 comprises an endless race of bearing balls 3 which comprises an inner crown 4 and an outer crown 5.

The inner crown functions as an open ring to enable, in a determined relative position, moving parts to have free access from the outside of cage 10 to "cradle" 2 hollowed out inside shaft 1.

Bearing balls 3 are retained between two support parts 6 and 7 connected transversely to one another by bolts such as 8.

Parts 6 and 7 accommodate the bearing balls 3 of the outer crown 5 in a passage 9, in which a certain amount of play is provided for, and the bearing balls of the inner crown 4 having a degree of play between two retaining fingers or jaws 11 and two bearing surfaces 12.

The shaft 1 has, opposite or with respect to the bearing balls, a V shaped notch or asperity 13 the re-entrant angle bearing surfaces of which are normally in contact with the bearing balls 3 of the inner crown or curved element 4.

It can be seen that, the opening or aperture $\alpha$ of the recess of shaft 1 being always slightly greater than the diameter of a part 14 on which the welding operation is to be carried out and smaller than the inner diameter of the crown 4, the shaft 1 is captive transversally inside cage 10. In the axial direction of arrows $F_1$ and $F_2$ it is also maintained in position by the centering of the notch or asperity 13 around bearing balls 3 which are themselves pressed or maintained between parts 6 and 7.

As a result, it is easy to introduce the axis, represented by a dotted line at 14, of a part to be machined, welded or inspected inside the shaft 1 and to enable the latter to turn freely inside cage 10 and to displace orbitally around the fixed axis 14 a working unit 15 integral with shaft 1.

The invention permits the use of perfectly calibrated small size bearing balls ensuring accurate centering. The overall thickness of the cage at "1" is small and all the lateral surface "L" of the roller bearing is free for the connections that may be foreseen with the working elements.

The "pliers" or "clamp" are particularly suitable for tube welding, machining and inspection operations.

In particular, the open ball bearing may also be used with a fixed shaft 1, the cage 10 being rotary as well as axis 14.

It is understood that the present invention has been described above in its indicative, but in no way limitative, preferred form of embodiment and that any equivalent means may be introduced into its constituent elements without departing from its scope defined by the attached claims.

I claim

1. Bearing arrangement comprising a C-shaped cage member including an open inner crown and an outer crown forming a single endless race or track, a plurality of bearing balls disposed in said endless race or track, a hollow or recessed C-shaped shaft coaxially disposed within said cage member and in rotating relationship therewith, said rotating relationship being afforded by protruding surfaces of said bearing balls against said shaft along said inner crown whereby relative rotation of said shaft and said cage member may be selectively effected to permit angular alignment and separation of openings of said cage member and said shaft for introducing or removing a part to be treated and for retaining a part therein during treatment, respectively.

2. Bearing arrangement according to claim 1, in which said cage member comprises two support parts integrally attached to one another on either side of said inner and outer crowns of the endless race or track.

3. Bearing arrangement according to claim 2 in which the bearing balls along the inner crown protrude inside the cage between two fingers or jaws fitted on said support parts, so as to penetrate inside said race or track protruding on said recessed shaft.

4. Bearing arrangement according to claim 3 in which the recess of said shaft forms a cradle and has an opening or aperture similar to said cage member to enable an an axle portion of a part for treatment to be directly lodged into the cradle of the recessed shaft, and working elements being integral with said cage member to enable a mass production or large scale circular operation on the rotating part.

* * * * *